Figure 1:
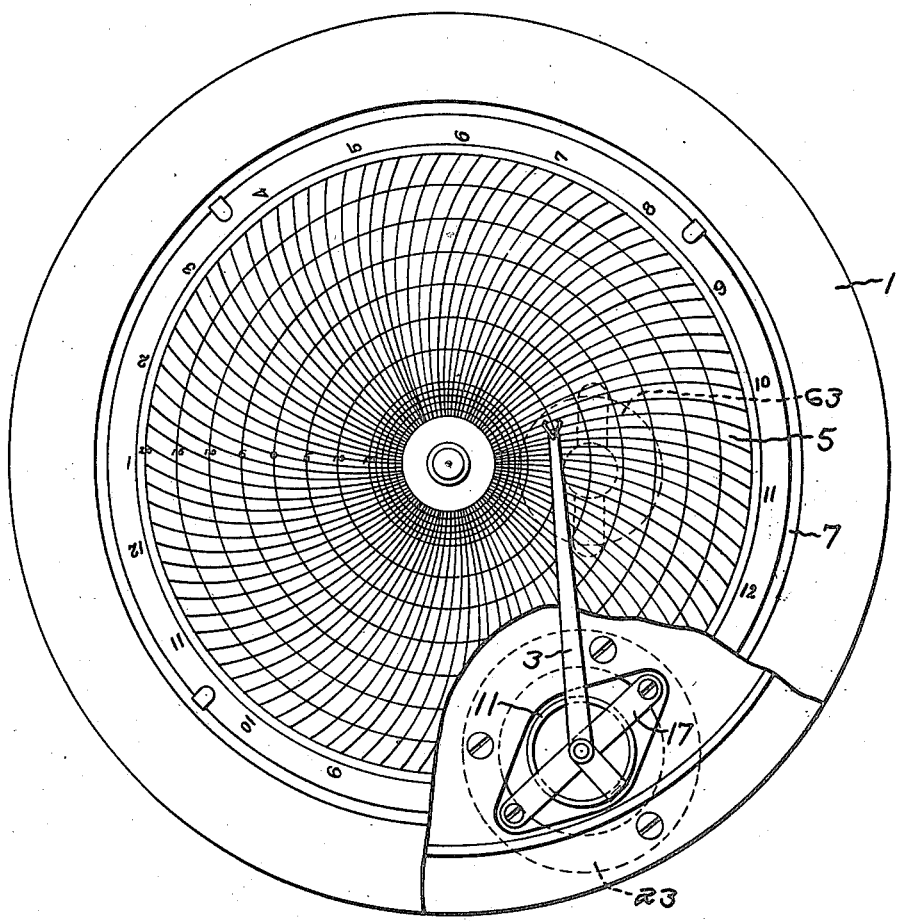

E. H. BRISTOL.
THERMOMETER.
APPLICATION FILED OCT. 1, 1914.

1,307,037.

Patented June 17, 1919.
2 SHEETS—SHEET 1.

Witnesses:

Inventor:
Edgar H. Bristol,
Att'ys.

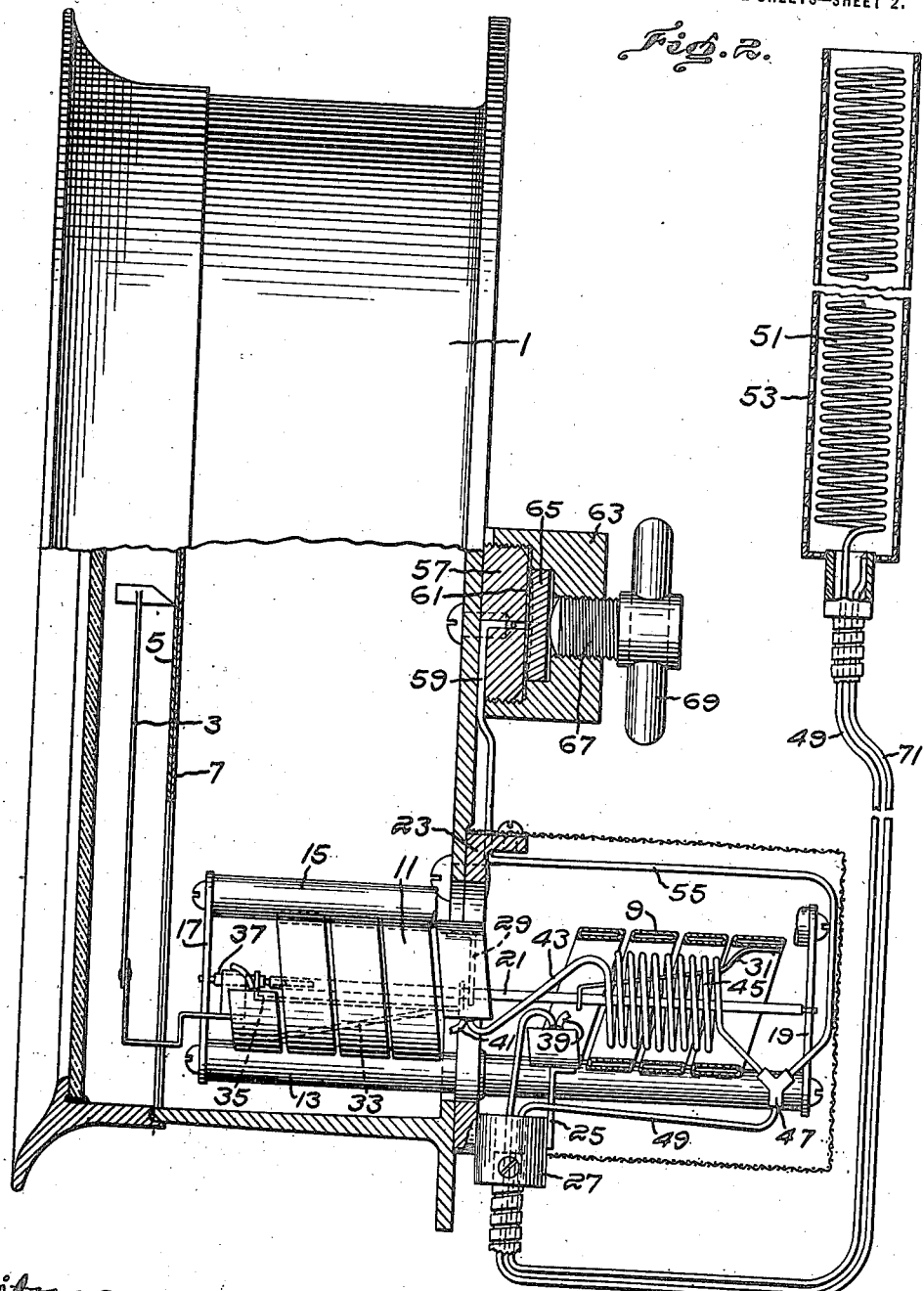

UNITED STATES PATENT OFFICE.

EDGAR H. BRISTOL, OF FOXBORO, MASSACHUSETTS, ASSIGNOR TO THE FOXBORO COMPANY, OF FOXBORO, MASSACHUSETTS, A CORPORATION OF MASSACHUSETTS.

THERMOMETER.

1,307,037.  Specification of Letters Patent.  Patented June 17, 1919.

Application filed October 1, 1914. Serial No. 864,526.

*To all whom it may concern:*

Be it known that I, EDGAR H. BRISTOL, a citizen of the United States, and a resident of Foxboro, Massachusetts, have invented an Improvement in Thermometers, of which the following description, in connection with the accompanying drawings, is a specification, like characters on the drawings representing like parts.

This invention relates to thermometers and among other objects aims to provide a simple and accurate thermometer for registering low temperatures. The character of the invention may be best understood by reference to the following description of an illustrative embodiment thereof shown in the accompanying drawings, wherein:

Figure 1 is a front elevation of the illustrative thermometer shown herein as embodying the invention; and Fig. 2 on an enlarged scale is a view partly in side elevation and partly in section of the thermometer shown in Fig. 1.

Referring to the drawing, the illustrative thermometer shown therein as embodying the invention comprises a casing 1 containing an index 3 adapted to be moved over a dial 5 which may be mounted on a plate 7 adapted to be rotated by a usual clock train (not shown). To govern the movement of the index there are provided compensating and indicating devices shown herein in the form of coiled helical tubes 9 and 11 arranged in tandem. To support these tubes there is provided a frame consisting of two posts 13 and 15 connecting end plates 17 and 19 in which is journaled a shaft 21. Intermediate said plates and apertured to receive said posts is a ring 23 conveniently secured on the back of the casing 1. One end of the compensating tube 9 is secured to an arm 25 projecting from a boss 27 fast on the ring 23. The indicating tube 11 is independent of the compensating tube and the frame. It is carried by and supported on said shaft 21 by an arm 29 connected to said shaft and to one end of said tube. To transmit movement from the compensating tube to the shaft there is connected thereto an arm 31 extending diagonally toward the shaft 21 and secured thereto. The free end of the indicating tube is connected by a similar diagonal arm 33 with a U-shaped strip 35 having one end loose on said shaft and the opposite end connected to a sleeve 37 rotative on said shaft and carrying the index 3 referred to.

The indicating and compensating tubes are of equal length and capacity and are filled with alcohol or any appropriate fluid. In order to make certain that the tubes contain equal volumes their ends may be provided with short pipes 39 and 41 which may constitute extensions of said tubes. These pipes are cut off and their ends are sealed according to the lengths necessary to provide said equal volumes.

The indicating tube is connected to a pipe of small gage 43 having a portion of its length formed to present a helical coil 45 encircling the shaft 21 and conveniently located within and spaced from the compensating tube 9. The pipe is led thence to a three-way union 47 which is soldered or otherwise made fast to the post 13 of the tube supporting frame. This union is connected to a pipe 49 passed through the boss 27 referred to and led thence to a temperature responsive bulb 51 shown herein as a continuation of the pipe 49 and coiled in the form of a helix, thereby providing a bulb having an extensive surface rendering the same sensitive and quickly responsive to temperature conditions. To protect the bulb and prevent distortion thereof it may be provided with a cylindrical casing 53 perforated to permit the free access to the bulb of the medium the temperature of which is to be taken.

The coil 45 by being interposed between the fixed union 47 and the end of the indicating coil provides a readily flexible connection for the pipe with the indicating tube which will permit free and unimpeded movement of the indicating coil in response to temperature changes.

This thermometer may be used for registering the low temperatures of refrigerating plants and might experience, for example, a range of temperature from 20° Fahrenheit below zero to 20° above zero. The latter temperature is lower than usual atmospheric temperatures such as the thermometer would be likely to experience in shipmen to its place of use. A temperature higher than 20 degrees, the upper limit for which the thermometer is designed, would be likely to create an excessive pressure in the system such as might unwind the helical indicating tube and stretch or distort the same sufficiently to destroy its accuracy when placed in use. To avoid any possibility of this occurrence there is provided means for varying the effective volume of the system, thereby reducing or increasing the pressure in the system. To accomplish this a pipe 55 is provided having one end connected to the three-way union 47 referred to and its opposite end entered in a hole in the center of a disk-like thick plate 57 secured by screws to the casing. The pipe may be soldered in said hole to prevent any possibility of leakage around the same and the rear face of said plate may have a radial groove 59 to accommodate said pipe. Over the open end of said pipe is a very thin diaphragm 61 of bronze or other appropriate material having its margin sweated or otherwise made fast to said plate. The pressure in the system will tend to cause this diaphragm to bulge upward away from the open end of said pipe and in so doing it increases the volume of the system and reduces the pressure therein. The movement of the diaphragm is sufficient to provide an increased volume sufficient to prevent undue strain on or distortion of the instrument. To control this pressure a box 63 may be threaded to said disk plate, said box having a cylindrical chamber receiving a pressure disk 65 adapted to be pressed toward said diaphragm by the engagement therewith of the end of a screw 67 tapped into said box and having a handle 69 permitting the ready turning thereof. When the screw is tightened it presses said diaphragm down toward the open end of said pipe and reduces the volume of and increases the pressure in the system. The construction may be so arranged that when the screw is set down to the limit of its adjustment the appropriate pressure in the system will be had.

When the instrument is being shipped the screw is adjusted to release the diaphragm and the pressure in the system thereon causes the same to bulge away from the open end of the pipe and thereby releases the pressure in the system sufficiently to prevent injury thereto. When the instrument is set up in the place where it is to be used the screw is tightened as described and then there is provided in the system the proper pressure for use.

If the refrigerating plant should be shut down the screw is again released in order to prevent injury to the instrument from temperatures higher than the range of temperature for which the instrument is designed.

A pipe 71 is connected to the compensating tube and bulb and is similar to and of substantially equal length with the pipe which leads from the bulb to the indicating tube, but the end of the compensating tube pipe adjacent the bulb is closed and does not communicate therewith. The temperatures surrounding the indicating and compensating tubes and the pipes leading thereto are likely to be greater than the temperatures to which the bulb is subjected. These equal length pipes are equally responsive to such outward temperatures and prevent the influencing of the index therefrom.

The indicating and compensating tubes as shown herein are coiled in the same direction, but their opposite ends are connected to the index and shaft respectively. Consequently pressure variations in said tubes create winding or unwinding movements thereof in opposite directions. The indicating tube is responsive both to the temperatures in the refrigerator and to temperatures external thereof, whereas the compensating tube is responsive merely to temperatures exterior thereof. Since said tubes work in opposite directions the effect of external conditions on one will neutralize such effect on the other and the indicating tube will be accurately moved in response merely to the temperature within the refrigerator and will cause the index to produce an accurate registration of such temperature.

Since the pressure within the system is appropriate for the range of low temperatures for which the instrument is designed the graduations on the scale may be widely spaced, thereby permitting an easy visualization thereof and greatly facilitating the quick accurate reading of the index.

The operation of the instrument may be briefly described as follows. We shall assume that the screw 67 has been actuated to seat the diaphragm 61, therefore the volume of the system including the various pipes and the two tubes 9 and 11 is constant. The bulb comprising the coil 51 and its protective casing 53 is exposed to the temperature which it is desired to measure, the casing 1 being located at any convenient distance away. The coil 51 is of such form and of such material that it is not perceptibly distorted by variations of pressure caused by variations of temperature. The rugous surface presented by the coil, however, provides a large area susceptible to the temperature conditions to be measured.

The pressure developed in the bulb coil 51 is transmitted without any impairment due to distortion of the coil through the connecting pipe 49, through union 47, to tube 11 which is distorted thereby and actuates the index 3. The free movement of the tube is permitted because of the coil 45 which prevents the pipe from exerting any drag upon the tube. The thermal conditions about the instrument and about the transmitting connection are active on the pipe 71 and the tube 9 itself to distort the latter and this distortion will be transmitted by the connection 31 to the shaft 21 and from this shaft to the tube 11 and only the algebraic sum of the movements of the tubes 9 and 11 will be transmitted to the index, this resulting movement being an accurate measure of the temperature conditions surrounding the bulb of the instrument.

Having described one illustrative embodiment of the invention without limiting the same thereto, what I claim as new and desire to secure by Letters Patent is:

1. An instrument of the class described comprising, in combination, an index, and governing means therefor including indicating and compensating coiled tubes, a frame, a shaft journaled in said frame, means for fixedly supporting one of said coiled tubes, means for connecting the same to the shaft to communicate motion thereto, means to support the other tube on said shaft to receive motion therefrom and means operatively connecting said second tube to the index.

2. An instrument of the class described comprising, in combination, an index, a shaft, governing means for the index comprising indicating and compensating coiled tubes, means for fixedly supporting an end of one of the tubes and means for connecting its other end to the shaft to communicate motion thereto, means to support one end of the other tube from the shaft, means operatively connecting its other end with the index, fluid containing systems for exposure to temperature conditions comprising pipes communicating with said tubes one opening to the fixed end of the first tube and the other to the shaft-supported end of the second tube by a flexible tubular connection 45.

3. An instrument of the class described comprising an index and governing means therefor comprising indicating and compensating expansion tubes, one tube having an end operatively connected to said index and the other tube having an end fixedly supported, the opposite ends of the tubes being connected whereby said other tube will impart motion to the first, fluid containing systems for exposure to temperature conditions comprising pipes communicating with said tubes, one opening to the fixed end of the said other tube and the other being convoluted to form a flexible connection 45, and opening to the so-called opposite end of the first tube.

4. An instrument of the class described comprising an index and governing means therefor comprising indicating and compensating expansion tubes, one tube being fixedly mounted at one end and the other tube movably mounted and connected to the opposite end of said first tube to receive the motion thereof and also having an end operatively connected to said index, fluid containing systems for exposure to temperature conditions comprising pipes communicating with said tubes, one opening to the fixedly mounted end of one tube and the other opening to said movably mounted tube and being convoluted to form a flexible connection thereto permitting unimpeded movement thereof.

5. An instrument of the class described comprising in combination, an index, and governing means therefor including indicating and compensating tubes, means whereby the indicating tube is moved bodily by the compensating tube, a bulb, and a pipe connecting said bulb with said indicating tube and having provision permitting movement of said indicating tube substantially unimpeded by said pipe.

6. An instrument of the class described comprising in combination, an index, and governing means therefor including indicating and compensating tubes means whereby the indicating tube is moved bodily by the compensating tube, a bulb, and a pipe connecting said bulb with said indicating tube and formed to present a flexible coil for permitting substantially unimpeded movement of said indicating tube.

7. An instrument of the class described comprising in combination, an index, and governing means therefor including indicating and compensating tubes, means whereby the indicating tube is moved bodily by the compensating tube, a bulb, a pipe connecting said bulb with said indicating tube having a flexible coil therein, a frame supporting said tubes, and means for securing said pipe to said frame at a point between said coil and bulb.

In testimony whereof, I have signed my name to this specification, in the presence of two subscribing witnesses.

EDGAR H. BRISTOL.

Witnesses:
  HENRY T. WILLIAMS,
  ROBERT H. KAMMLER,